(12) United States Patent
Abel (10) Patent No.: US 7,118,115 B2
(45) Date of Patent: Oct. 10, 2006

(54) CART WITH FOLDABLE WHEELS AND CENTER POLE

(76) Inventor: Helmut Abel, 74, Bd. d'Italie, 9800 - Monte Carlo (MC)

(\*) Notice: Subject to any disclaimer, the term of this patent is extended or adjusted under 35 U.S.C. 154(b) by 130 days.

(21) Appl. No.: 10/654,833

(22) Filed: Sep. 4, 2003

(65) Prior Publication Data

US 2004/0245733 A1    Dec. 9, 2004

(30) Foreign Application Priority Data

Sep. 4, 2002    (DE) .................. 102 40 895

(51) Int. Cl.
B62B 3/02    (2006.01)
(52) U.S. Cl. .............. 280/43.13; 280/38; 280/651; 280/79.11
(58) Field of Classification Search .............. 280/38, 280/39, 651, 659, 47.34, 79.11, 79.4, 40, 280/652, 43, 43.13, 43.17
See application file for complete search history.

(56) References Cited

U.S. PATENT DOCUMENTS

| | | | | |
|---|---|---|---|---|
| 406,872 A | * | 7/1889 | Bear | 280/39 |
| 913,082 A | * | 2/1909 | Wilchinsky | 280/39 |
| 2,587,688 A | * | 3/1952 | Bosk | 280/39 |
| 3,400,942 A | * | 9/1968 | Hull | 280/39 |
| 4,274,644 A | * | 6/1981 | Taylor | 280/39 |
| 4,398,736 A | * | 8/1983 | De Wijn | 280/40 |
| 4,659,096 A | * | 4/1987 | Leimgruber | 280/39 |
| 5,772,222 A | | 6/1998 | Sim et al. | |
| 6,607,207 B1 | * | 8/2003 | Shapiro et al. | 280/287 |
| 6,733,026 B1 | * | 5/2004 | Robberson et al. | 280/415.1 |
| 6,845,991 B1 | * | 1/2005 | Ritucci et al. | 280/30 |

FOREIGN PATENT DOCUMENTS

| | | |
|---|---|---|
| DE | 89 06 706 | 8/1989 |
| DE | 197 07 744 C1 | 10/1998 |
| DE | 20105217 | 8/2001 |
| WO | 00/73122 | 12/2000 |
| WO | WO 00/73122 | 12/2000 |

\* cited by examiner

*Primary Examiner*—Jeff Restifo
(74) *Attorney, Agent, or Firm*—Akerman Senterfitt; Stephan A. Pendorf; Peter A. Chiabotti (57) ABSTRACT

The present invention concerns a cart with a flat cargo platform adapted to travel in the horizontal direction via foldable wheels mounted respectively via one wheel fork, and with a vertically pivotable pole handle.

27 Claims, 8 Drawing Sheets

CART WITH FOLDABLE WHEELS AND CENTER POLE

CROSS REFERENCE TO RELATED APPLICATIONS

This application is based upon German Patent Application No. 102 40 895.5, filed Sep. 4, 2002, from which priority is claimed.

BACKGROUND OF THE INVENTION

1. Field of the Invention

The invention concerns a cart with foldable wheels.

2. Description of the Related Art

A cart of this type is known from WO 00/73122. It includes a perpendicularly somewhat diagonally upwardly projecting frame element for pushing the cart. The projecting frame is collapsible into the cargo platform. Further, wheels foldable about horizontal axis are provided on the bottom side of the cargo platform, wherein the front wheels besides this are pivotable about a vertical axis. This known cart is not very easy to operate, since is includes relatively complex mechanisms for locking the push element and wheels into place in the assembled condition as well as the folded together condition. Besides this, it is difficult to keep the cart moving in the desired direction, since the pivotable front wheels do not easily follow any movement and may even prevent sideways movement. Finally, the manufacture thereof is complicated to the extent that different wheels must be manufactured and assembled to the front and the back ends of the cart. This increases the difficulty in the blocking of the front wheels. The pivotable front wheels, so-called swivel or steering wheels, must have an axial bearing, in order to be able to accept the load pressure of the transport cart, while at the same time, be easily rotatable. These steering wheels are broad or thick, particularly in the area of the bearings, and in the folded-in condition, are relatively thick, which increases the overall thickness of the folded-together cart. Besides this, the steering wheeels can get directed to a wrong direction on contact with even small impediments (cables, cross-grates, edges of carpets, etc.), making it necessary, while pushing the cart, to repeatedly force the cart back onto the desired direction. The complicated design of this known cart, in particular due to the many necessary construction components, is characterized by a high intrinsic weight, which is of disadvantage when folding and unfolding the cart, as well as during the transport thereof.

SUMMARY OF THE INVENTION

In accordance with the present invention, a high capacity cart with horizontal cargo platform and large undercarriage wheels is to be provided, which is easy to manufacture and operate, which is comprised of lighter-weight components than conventional carts, and which can be quickly and easily folded together to present an extremely flat shape which can be easily stored, particularly in a vehicle trunk. Thereby the weight of the transport cart is to be very low, and in particular the cart should be stably guided in a desired direction without being influenced by an uneven ground.

This task is inventively solved in a cart according to the present invention.

Preferred embodiments of the invention are set forth herein.

The securing of the handle to the swiveling mount makes possible the unproblematic movement of the cart in any desired direction without any impediment. This swiveling mount can also be pivoted 180° relative to the loading platform even when the handle is not in the folded-in position. Thereby the grip of the handle can project beyond the rear end of the cargo platform, and the cart can be carried via this handle grip or, in the case that the folded over wheels project beyond the edges of the cart, as is easily possible by appropriate shaping of the cargo platform, be easily transported upon one of the foldable wheels.

BRIEF DESCRIPTION OF THE DRAWINGS

On the basis of the figures, a preferred embodiment of the invention will be described in greater detail. There is shown.

DETAILED DESCRIPTION OF THE INVENTION

Figure 1:
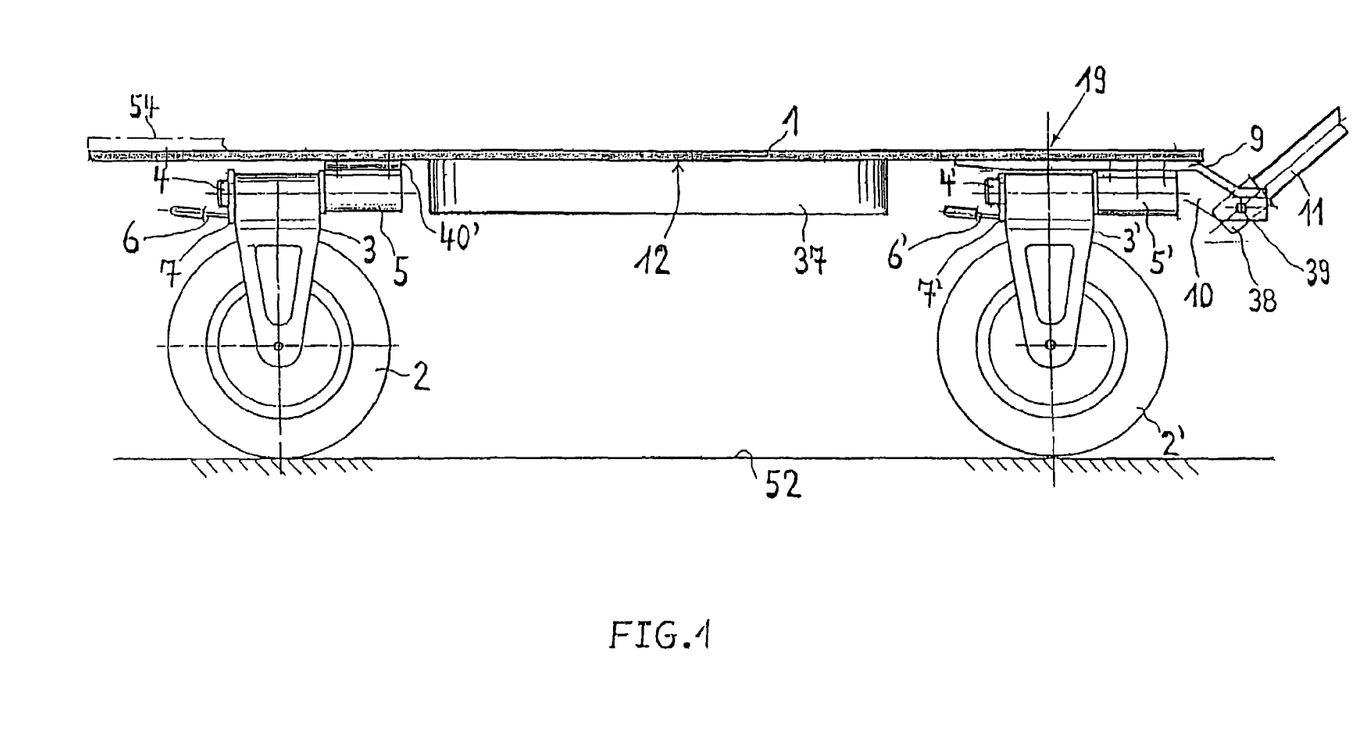
FIG. 1 a schematic side view of the inventive cart with foldable wheels located in the operating position, wherein the front part of the handle is broken away, FIG. 2 a bottom view of the cart shown in FIG. 1 with foldable wheels in the folded position, FIG. 3 an enlarged partial view of the cart wheel platform and a folded-in foldable wheel with the associated locking device, seen parallel to the longitudinal center line of the cart in the direction of travel towards the front, FIG. 4 a partial sectional enlarged partial view of a folding device with the associated bearing and locking device thereof, FIG. 5 a partial view corresponding to FIG. 4, which in comparison to FIG. 4 is rotated by 90°, FIG. 6 an enlarged view of a locking element for the foldable wheels, FIG. 7 a schematic representation of the cart in folded condition during transport by a user, FIG. 8 a longitudinal section through the handle with hand grip, FIG. 9 a partial view of a foldable wheel corresponding to FIG. 4 in an other embodiment of the associated bearing and locking device thereof, and FIG. 10 an axial section of the upper end of the carrier fork shown in FIG. 9.
Figure 2:
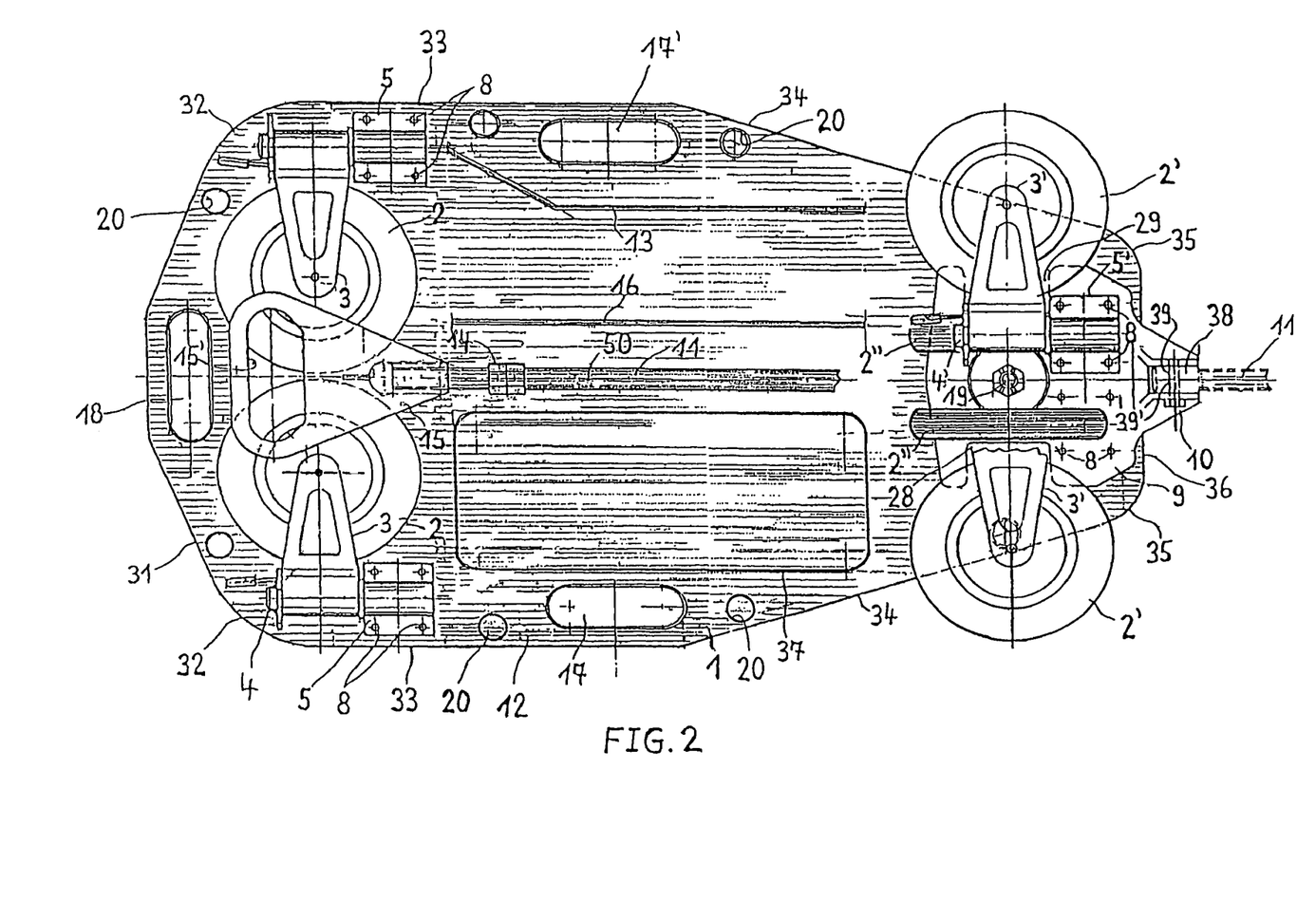

In the representation according to FIG. 1, the various foldable wheels 2, 2' are in an operating position projecting perpendicular from the cargo platform 1. The thin walled, essentially planar cargo platform is carried by two front foldable wheels 2' and two rear foldable wheels 2, of which in FIG. 1 respectively only one is to be seen. Each foldable wheel 2, 2' is rotatably mounted within a carrier or wheel fork 3, 3'. Each wheel fork is foldable in and out about a wheel fork rotation axle 4, 4' extending parallel to the longitudinal centerline 50 (FIG. 2) of the cart 1 between (a) an operating position of the foldable wheels 2, 2' shown in FIG. 1 and (b) a folded-in position (rear foldable wheels 2) or, as the case may be, folded-out (front foldable wheels 2') shown in FIG. 2. In FIG. 2 additionally each of the front foldable wheels 2' is also shown in the operating position 2", in order to illustrate the folding process.

Figure 3:
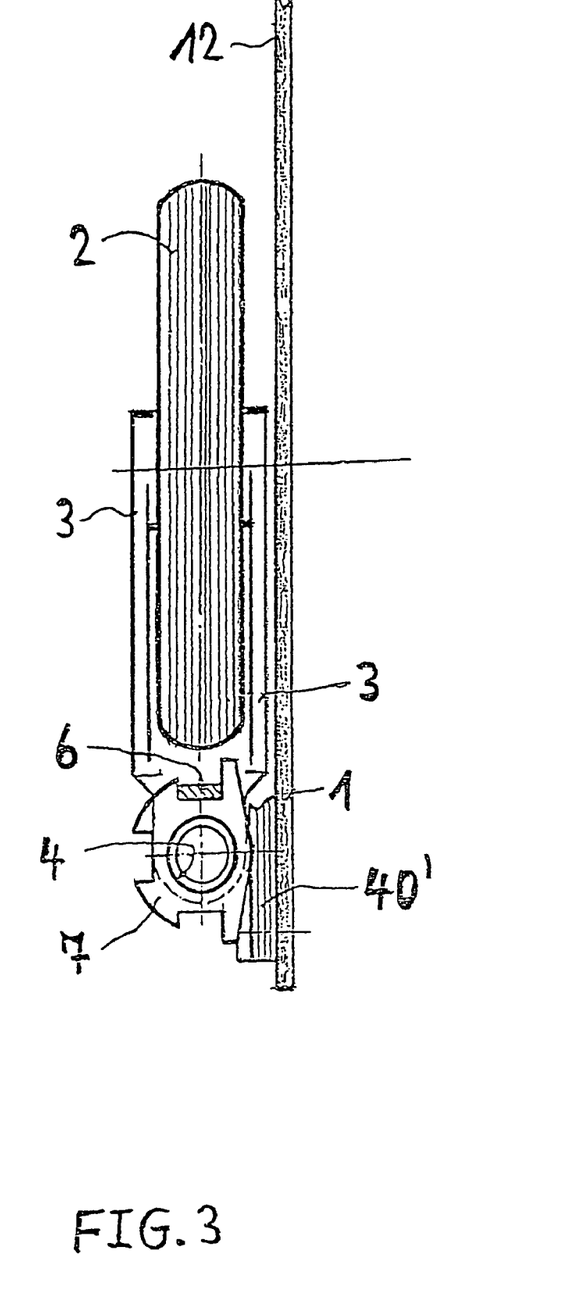
Figure 4:
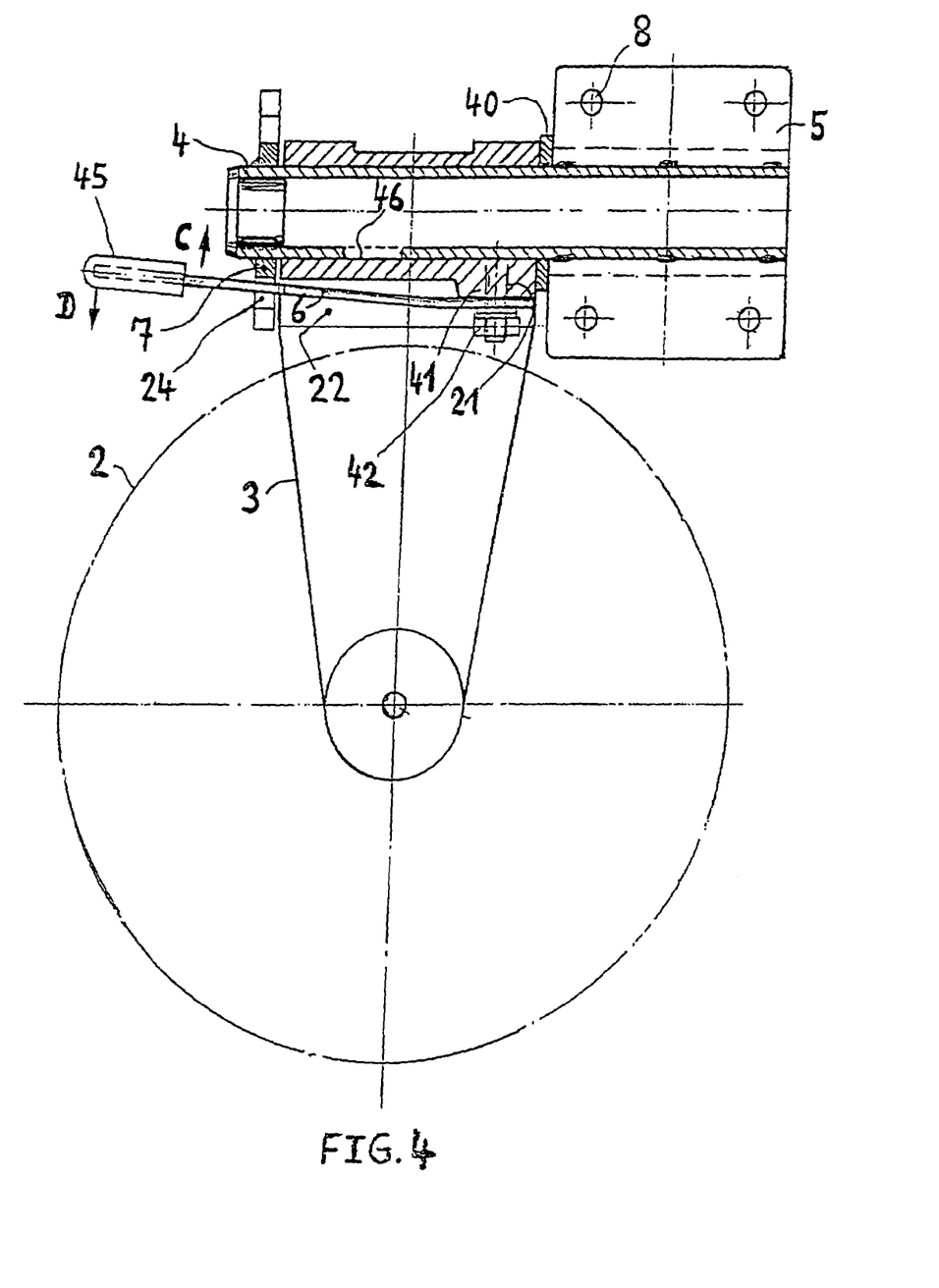
Figure 5:
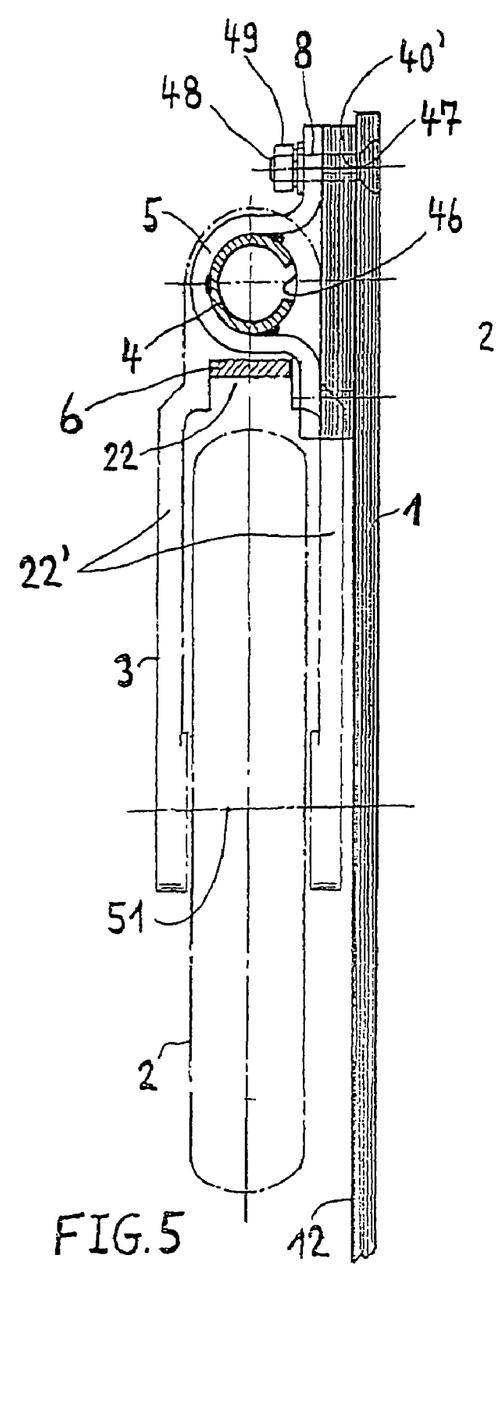

As can be seen from FIGS. 3 through 5, each wheel fork 3, 3' exhibits a substantially U-shaped recess 22 (FIG. 5)

between its fork shanks 22', in which a detent element 6 of the foldable wheel locking mechanism can move almost free-of-play, and in which therebelow respectively one foldable wheel 2, 2' is received. Each foldable wheel 2, 2' is mounted rotatably about a wheel axis 51 in the fork shanks 22'.

Each wheel fork 3, 3' is associated with a bearing or mounting bore 46 extending perpendicular to the wheel axis 51, which slidingly encompasses a wheel carrier fork rotation axle 4, 4' extending parallel to the carrier platform 1. The end of the wheel fork-rotation axle 4, 4' projecting out of the bearing bore 46 is tightly encompassed by a U-shaped segment of a securing element 5, 5' and is secured thereto. The end segment of the securing element 5, 5' extending parallel to the cargo platform 1 includes screw holes 8, through which threaded bolts 48 extend anchored in the cargo platform 1 and secured by nuts 49. Between the securing elements 5 and the cargo platform 1 distancing disks 40' are inserted for a purpose discussed in greater detail below, which likewise are penetrated-through by the threaded bolts 48. The securing element 5, 5' of the wheel fork-rotation axle 4, 4' can also be differently designed, for example, as a cylindrical mounting block with quadratic, square or other cross-section, and with a central hollow cylindrical recess for receiving one of the tubular shaped cantilevered or self-supporting carrier fork rotation-axles per interference-fit. The securing screws (threaded bolts 48, FIG. 5) are then screwed into the internal threading of the cylindrical securing block. The wheel fork rotation axle 4 need not absolutely be designed self supporting or cantilevered, but could be secured on both sides.

Figure 6:
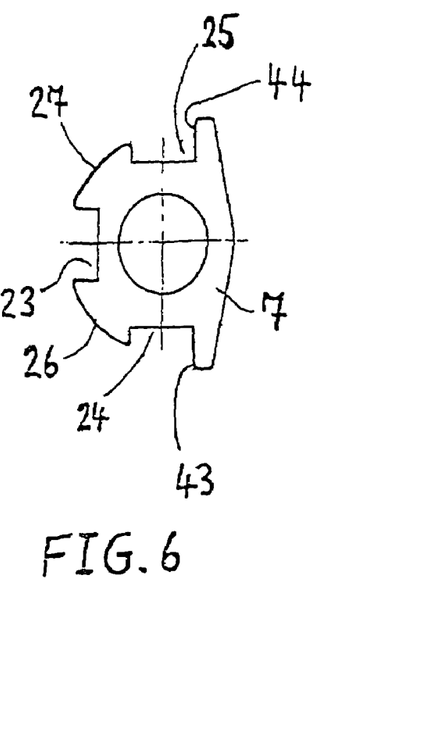

Close to the free carrying-end of the wheel fork rotation-axle 4, 4', which in this embodiment is tubular, there is on the outer side of the rotation axle secured, for example by welding, a wheel fork blocking element 7, 7' shown in greater detail in FIG. 6. In similar manner the opposite tube end can be secured in the U-shaped recess of the securing element 5, 5' by welding. The blocking element 7, 7' exhibits on its circumference three respective indentations 23, 24, 25 in angular separations of 90°. Curve tracks 26, 27 are provided between the indentations 23, 24, 25. On a thickening or reinforcement 41 of the wheel fork 3, 3', which lies within the U-shaped recess 22, the end of a detent element spring 6 is tensioned or clamped in via a threaded bolt 21 and a thereupon seated nut 42, of which the opposite free end carries a finger protection cap 45. The detent element can engage in any of the indentations 23, 24, 25, since it is pretensioned against the circumference of the blocking element 7, 7' in such a manner that during rotation of the wheel fork 3, 3' it automatically engages in the next adjacent indentation 23, 24, 25 in the direction of the arrow C (FIG. 4). By lifting the finger protection cap 45 in the direction of the arrow D, detent element 6 can be lifted out of the respective indentation and slide over an adjacent curve track 26 or 27, until it snaps into the next indentation 23, 24, 25. In each of the indentations 23, 24, 25 the detent element 6, 6' of the associated wheel fork 3, 3' is fixed on both sides of the operating position in the operating position 2" or, as the case may be, in a folded position. In each of the folded positions, which differ by 180° about the wheel fork rotation axle 4, 4', the respective wheel fork 3, 3' lies very close to the bottom side 12 of the cargo platform 1, so that the total thickness of the collapsed cart is extraordinarily narrow.

Preferably the foldable wheels 2, 2' inclusive of the wheel forks 3, 3' and the associated folding mechanism in the inventive cart are of the identical construction and can be positioned at any location on the bottom side 12 of the platform 1 depending upon intended use. This means that it is possible, without any particular change in construction techniques, and using the same principle and using essentially the same components, to produce long, short, wide or narrow carts. At the rear end of the cart, it is possible to provide four or more foldable wheels 2, 2' in a row next to each other, whereby the load bearing capacity of the cart can be greatly increased. Thereby, likewise, no change in the components of the construction is necessary.

While the cart discussed in the introductory part of the specification is relatively heavy due to the large number of parts, the inventive cart, in comparison having the same load bearing surface, is extraordinarily light weight. Thereby it's operation and transport is particularly facilitated.

Figure 7:
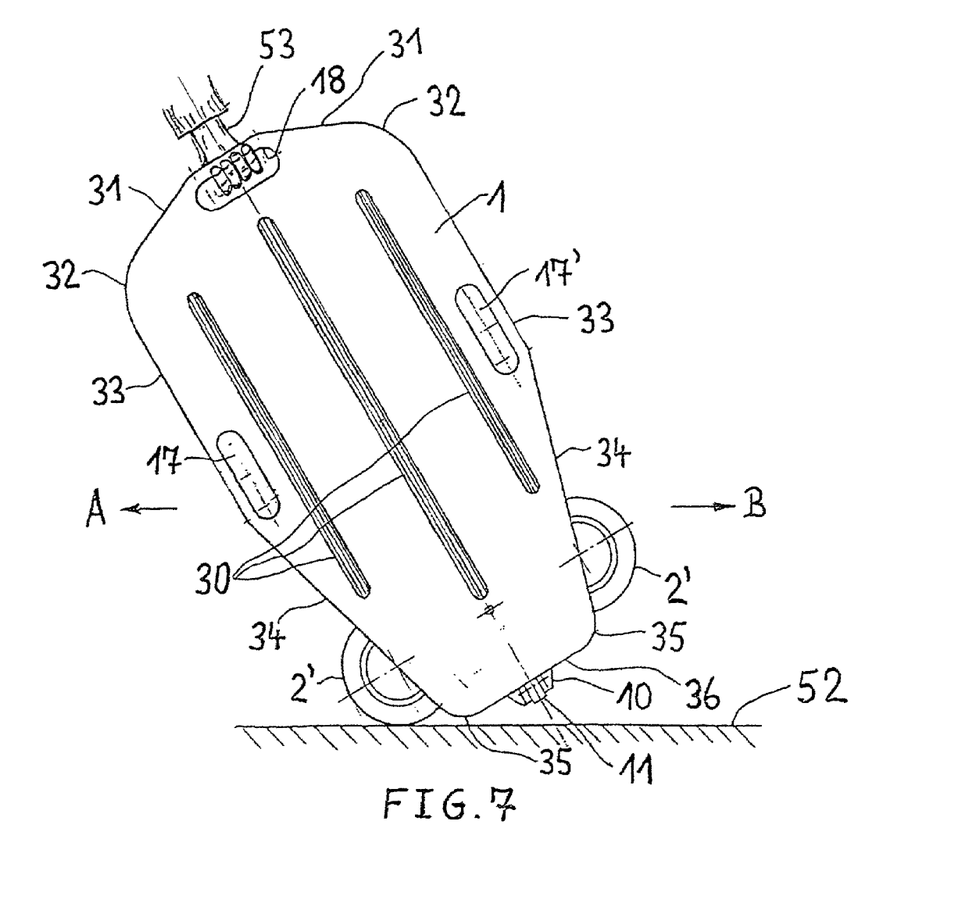

On the sides set off from the curve tracks 26, 27 the diametrically oppositely lying indentations 24 and 25 are provided with a higher side wall 43 or as the case may be 44, so that the detent element 6, 6' cannot leave the indentation in this direction. Therewith an extraordinarily reliable securing of the foldable wheels 2, 2' is possible in the operating position according to FIG. 1 or, as the case may be, the collapsed position according to FIG. 2. As can be seen in particular from FIG. 2, the wheel fork-axle 4 of the rear foldable wheels 2 are secured close to the outer edge 33 of the cargo platform 1, so that the two associated foldable wheels 2 can be folded inwards towards the longitudinal centerline 50, while the wheel fork rotation-axle 4' of the front foldable wheels 2' is positioned close to the longitudinal center line 50, so that the two foldable wheels 2' come to rest projecting from the side edges 33 of the cargo platform 1. This is made possible by the special design of the cargo platform 1. This design is defined by a slightly bowed-out rear edge 31, two parallel straight longitudinal sidewalls 33, which transition to the rear edge 31 respectively by curvature 32, two side edges 34 merging towards each other towards the front, thus narrowing the front part of the cargo platform 1 and a front edge 36 running perpendicular and connecting the sidewalls 34. By the narrowing of the cargo platform 1 in the front area, that is, in the area of the sidewalls 34, the outwardly folded front foldable wheels 2' shown in FIG. 2 in the collapsed position can project sideways beyond the side edges 34, so that the cart situated in the folded together condition, as can be seen in FIG. 7, can run with one of its front foldable wheels 2' on the ground 52. Thereby, the oppositely lying rear end is held in the hand 53 of the user or, as the case may be, pulled along. For facilitating this holding, an oval through-hole 18 is provided in the cargo platform 1 close to the rear edge 31. The through-hole serves as grip and is preferably beveled at its edges. Two further substantially similar through-holes 17 and 17' close to the longitudinal edges 33 can likewise serve as grips, in this case for carrying the cart. The side edges 34 likewise transition via curvature 35 to the front edge 36. During rolling of the collapsed cart on one of its front foldable wheels 2', according to FIG. 7, this can be either pulled in the direction of arrow A or pushed in the direction of arrow B.

The narrowed side-wheels 34 of the cargo platform 1 are very beneficial even during the pulling of the cart by means of the folded-out handle 11. If, namely, a significant change in direction is to be accomplished during pulling of the cart, for example deviating from the previous direction of travel by up to 90°, the front end of the swivel mount 9 must extend so far beyond the front of the cargo platform 1, that during turning of the swivel mount 9 by up to 90°, it would have to be able to project beyond the rim of the cargo platform 1 for any position. Otherwise, the cargo platform would prevent a slanted positioning of the handle 11, which would be the natural position when being pulled by the pulling hand of the user, and a free rotation of the swivel mount 9 would not be possible. As a result of the narrowed side edges 34, the front of the swivel mount 9 projects beyond the circumference of the cargo platform 1 in any direction of rotation. Therewith, a change in direction of the transport cart of 90° is possible due to the suitable shape of the cargo platform 1 and even beyond this. Thereby the swivel mount 9 can be significantly shortened in the longitudinal direction of the cart and therewith the total length of the cart can be substantially reduced.

From the front side of the cargo platform 1, there project, barely noticeably, parallel longitudinally-running anti-skid strips 30 for goods being transported on the cargo platform (not shown). From the bottom side 12 of the cargo platform 1 there slightly project reinforcement ribs 13 and 16, which in each case are lower than the running wheels 2, 2' and their wheel forks 3, 3' when in the folded position according to FIG. 2. For further reinforcement, there is also a box 37 slightly projecting on the bottom side 12, which is provided essentially parallel to the cargo platform 1 and serves, besides reinforcement, also for storage of cargo straps, elastic bands with hooks, and the like. The box 37 has, as in the case of reinforcing ribs 13, 16, maximally the height of the wheel forks 3, 3' below the bottom side 12 of the cargo platform 1. It is also possible to provide a multiplicity of such boxes 37 on the bottom side 12. In the area of the narrowing front part of the cargo platform 1 there is provided, on the bottom side 12, a swivel mount 9 rotatable on the cargo platform about an axis of rotation 19, which includes recess 10 projecting from the front edge 36 of the cargo platform and slanted downwards, as can be seen from FIGS. 1 and 2. The thickness of the swivel mount 9 corresponds thereby to the thickness of the spacer disk 40', so that the securing elements 5 and 5' of the rear or, as the case may be, front foldable wheels 2, 2' lie in the same separation below the bottom side 12 of the cargo platform 1. Thereby an essentially horizontal position of the cargo platform is guaranteed. The slanted recess 10 of the swivel mount 9 is shaped as a fork and receives flush or level a handle block 38 suited at the lower end of the handle 11, which includes a transverse extending, cylindrical, through-going opening 39 and a threaded bolt extending through this opening 39 and screwed tight to the recess 10. Thereby, the handle 11 is pivotable in the vertical direction and can, on the other hand, be pivoted in the horizontal direction about the rotation axis 19 together with the swivel mount 9 for steering the cart.

Figure 8:
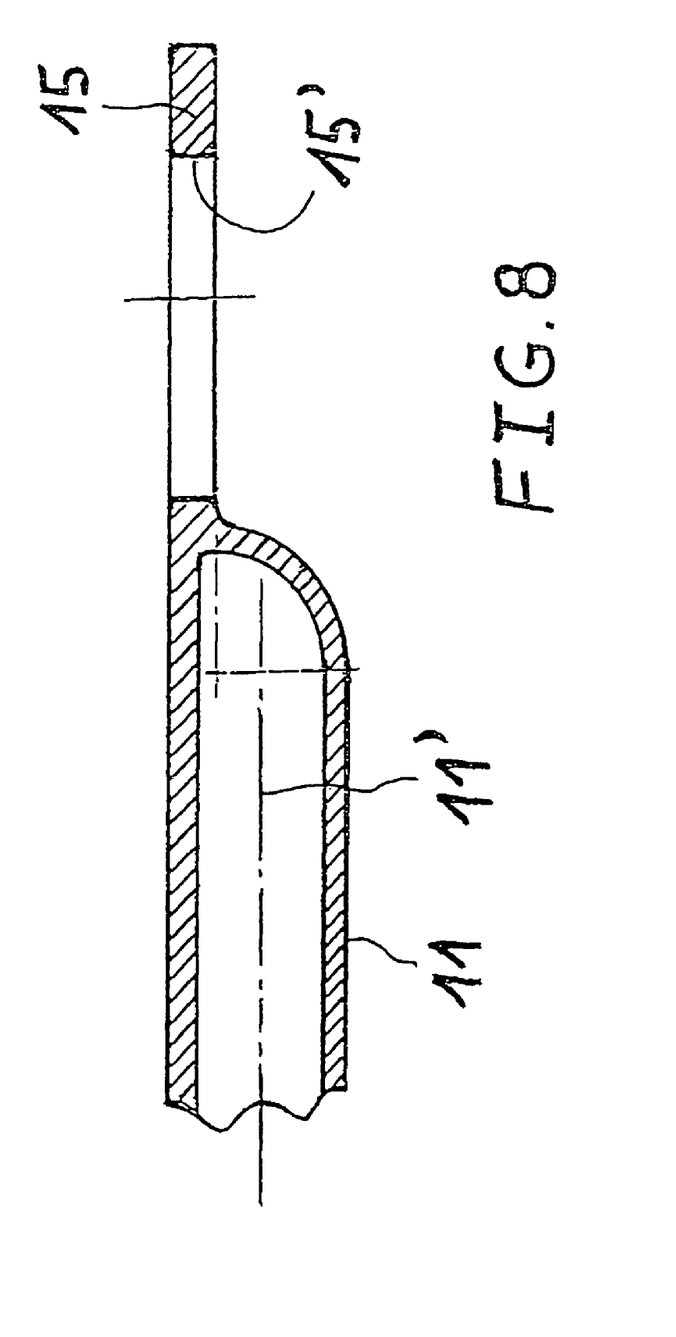

When the front foldable wheels 2' are in the outer folded position shown in FIG. 2, the mounted handle 11 can be folded between the two wheel forks 3' parallel and close the bottom side 12 of the cargo platform 1 towards the back, so that it can be folded from the position indicated with dashed lines on the right end of FIG. 2 into the rearward directed folded-in position lying almost against the bottom side 12 according to FIG. 2. In this position, it can snap into a fork-like or approximately U-shaped holder clamp 14, so that it is held securely on the bottom side 12. The outer end of the handle 11 is in the form of a flat hand grip 15, which widens for comfortable guidance by one hand and includes an appropriate oval opening 15'. It can be seen from FIG. 8 that the hand grip 15 with its opening 15' was slightly offset to the side or double-curved relative to the longitudinal axis 11' of the handle 11, so that when in its position in FIG. 2 it lies on the outer side of the folded-in outer foldable wheels 2 outside of the wheel forks 3. The total thickness between the upper side cargo platform 1 and bottom side of the collapsed handle hand grip 15 is not larger than that between the upper side and the wheel forks 3, 3'. Therewith, there results, overall, an extraordinarily slender and lightweight construction of the cart, which is easily transported, steered and, in the folded together condition, is easily stored.

So that the wheel forks 3' of the front foldable wheels 2' are not impeded by the swivel mount 9 during sideways folding-in into the folded position according to FIG. 2, there are on both sides of the swivel mount 9, seen in the vertical direction, U-shaped recesses 28 and 29, in which respectively one side shank of each wheel fork 3' can extend into when in the folded position.

Since all four foldable wheel components are completely identical, there results a great advantage for the mass-production of the inventive cart. Each foldable wheel can, as illustrated, as desired, be pivoted into any of three positions, that is, an operating position and two opposite folded positions, and can be locked in each of these positions. Thus, it would also be possible in the framework of the invention, for example, for the design of a higher capacity cart, to provide at the back four of these identical foldable wheel units in a row, side-by-side, wherein in the folded position of the cart, the two inner foldable wheels can be pivoted in a simple manner towards the centerline 50 and the two outer foldable wheels towards outwards.

Between each wheel fork 3, 3' and the securing element 5, 5' of the respective foldable units, there is a round spacer disk 40, which ensures a problem-free rotation and at the same time axial mounting or holding of the wheel forks 3, 3' (see FIG. 4). On the other axial end each wheel fork 3, 3' is respectively held by the wheel fork locking element 7, 7' lying with play against the wheel fork.

At the left end of FIG. 1, a further alternative embodiment of the cargo platform is indicated, with a laminated-on upper surface 54, which is connected with the cargo platform 1 in such a manner, that a conventional, somewhat stronger or reinforced cargo surface is formed.

Figure 9:
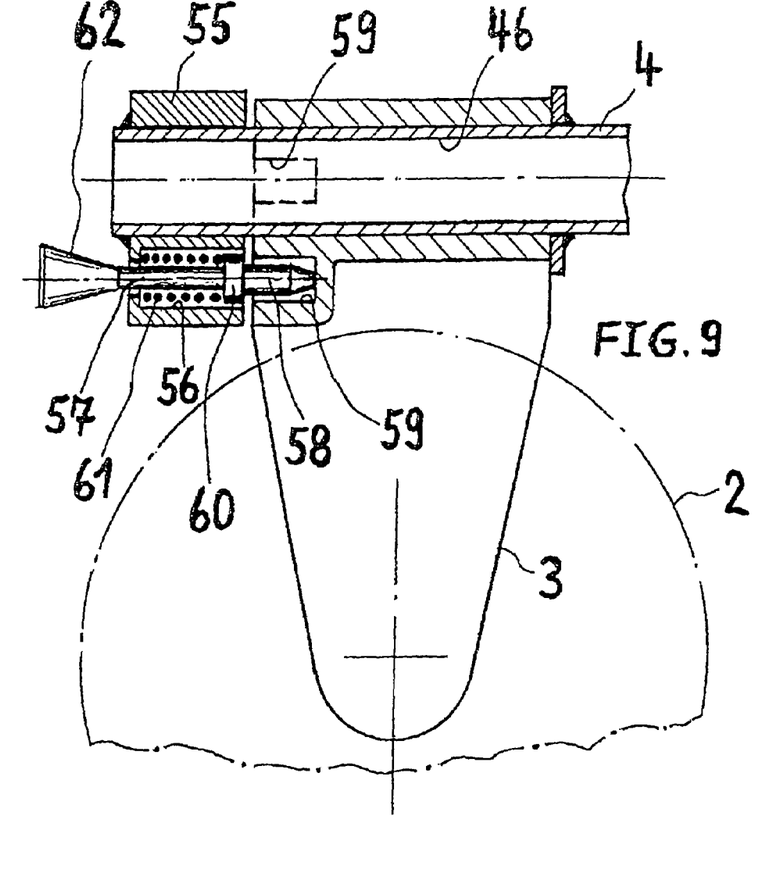
Figure 10:
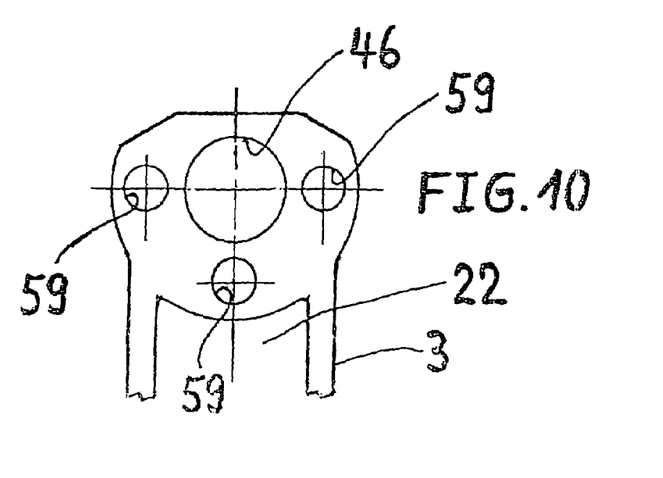

Another embodiment of the foldable wheel locking mechanism is shown in FIGS. 9 and 10. Instead of the carrier fork blocking element 7, 7' as shown in FIGS. 4 and 6, in this embodiment on the wheel fork rotation-axle 4, 4' a guide element 55 encompassing this is provided, which radially outside of the wheel fork-rotation axle 4, 4' has at least one hollow cylindrical recess 56 for the sliding reception of a securing bolt 57, of which the tip section 58 is insertable in a hollow cylindrical recess 59 of the respective carrier fork 3, 3' by axial sliding of the securing bolt 57. Thereby, a securing of the foldable wheel 2, 2' or, as the case may be, the wheel fork 3, 3' in a running position. Since, however, in the illustration three cylindrical recesses 59 respectively offset by 90° are provided in the wheel fork 3, 3', the tip segment 58 of the securing bolt 57 allows itself to be selectively inserted into one of the two cylindrical recesses 59, so that a securing is possible in two opposing folded positions of the foldable wheel 2, 2'. This reception of the tip segment 58 in the cylindrical recess 59 can, in contrast to the exaggerated illustrated representation in FIGS. 9 and 10, for easier understanding, occur nearly free of play.

The guidance of the securing bolt 57 within the recess 56 of the guide element 55 can likewise occur free of play. For biasing in the securing position, the securing bolt 57 exhibits within the cylindrical recess 56 a thrust collar 60, which is based in the direction towards the tip segment 58 via a pressure spring 61, so that the tip segment 58 can be extracted out of the cylindrical recess 59 only by operation of a hand grip 62 widening out of the guide element 55.

In a further alternative embodiment the carrier fork 3, 3' does not exhibit three hollow cylindrical recesses 59 set-off respectively by 90° as shown in FIGS. 9 and 10, but rather only one single, namely, the central of the three cylindrical recesses 59, while in the guide element 55 respectively three cylindrical recesses 56 set off by 90° are provided. The securing bolt 57 can be selectively received in these cylindrical recesses 56. In this case, the thrust collar 60 must, of course be omitted, since otherwise the securing bolt 57 cannot be pulled out of the recess 56. In many applications this simplified method of securing is adequate.

Reference Number List

| Pos. | Description |
| --- | --- |
| 1 | cargo platform |
| 2, 2' | foldable wheels |
| 3, 3' | wheel fork |
| 4, 4' | wheel fork-rotation axle |
| 5, 5' | securing element |
| 6, 6' | detent element |
| 7, 7' | wheel fork block element |
| 8 | screw holes |
| 9 | swivel mount |
| 10 | swivel mount recess |
| 11 | handle |
| 11' | handle longitudinal axis |
| 12 | bottom side |
| 13 | reinforcing ribs |
| 14 | securing clamp |
| 15 | handle grip |
| 15' | opening |
| 16 | reinforcing ribs |
| 17, 17' | through hole as hand grip |
| 18 | through hole as grip |
| 19 | rotation axis |
| 20 | through holes |
| 21 | threaded bolts |
| 22 | U-shaped recess |
| 22' | fork shanks |
| 23 | indentation |
| 24 | indentation |
| 25 | indentation |
| 26, 27 | curve track |
| 28, 29 | U-shaped recesses |
| 30 | anti-skid strips |
| 31 | back edge |
| 32 | curvature |
| 33 | longitudinal side edges |
| 34 | side edges |
| 35 | curvature |
| 36 | front edge |
| 37 | box |
| 38 | handle block |
| 39 | cylindrical through hole |
| 40, 40' | spacer disks |
| 41 | thickening |
| 42 | nut |
| 43, 44 | higher side wall |
| 45 | finger protection cap |
| 46 | mounting bore |
| 47 | screw holes |
| 48 | threaded bolts |
| 49 | nut |
| 50 | longitudinal center line |
| 51 | rail axis |
| 52 | floor |
| 53 | hand |
| 54 | cover layer |
| 55 | guide element |
| 56 | hollow cylindrical recess |
| 57 | securing bolt |
| 58 | tip segment |
| 59 | hollow cylindrical recess |
| 60 | thrust collar |

-continued

Reference Number List

| Pos. | Description |
| --- | --- |
| 61 | helical spring |
| 62 | hand grip |

The invention claimed is:

1. A cart comprising:
a horizontal cargo platform traveling on foldable wheels, each wheel mounted on a wheel fork, the cargo platform having a top side and a bottom side;
a vertically pivotable handle;
wherein the handle is connected to the bottom side of the cargo platform via a swivel mount;
wherein the handle is linked to the swivel mount in such a manner that it is foldable to a folded-in position parallel to the bottom side of the cargo platform;
wherein the handle is securable in the folded-in position;
wherein at least two wheel forks are pivotally mounted on the cargo platform about an axis parallel to the cargo platform;
wherein two further wheel forks are pivotally mounted on the swivel mount about an axis parallel to the swivel mount;
wherein each wheel is securable in an operating position projecting perpendicular from the bottom side of the cargo platform and in at least one folded position parallel to the cargo platform,
wherein a wheel fork blocking element is secured to the wheel fork pivot axle;
wherein the wheel fork blocking element cooperates with a detent element fixed to the wheel fork to secure the wheel fork in the operating position or the folded-in position.

2. The cart according to claim 1 wherein the handle comprises a flat hand-grip, wherein the hand grip is offset relative to the handle axis.

3. The cart according to claim 2 wherein the handle grip in the folded-in position of the handle does not project further from the bottom side of the cargo platform than an outermost shank of each wheel fork in the folded-in position.

4. The cart according to claim 1 wherein a downward open holder clamp for securing the pole handle in the folded-in position is attached to the bottom side of the cargo platform.

5. The cart according to claim 1 further comprising the swivel mount includes a downward offset recess for vertical pivotable mounting the handle and wherein the handle pivot point lies at the bottom side of the cargo platform.

6. The cart according to claim 1 wherein each wheel fork comprises an U-shaped recess between its shanks for receiving the foldable wheel and a cylindrical mounting bore for receiving the fixed wheel fork-pivot axle via which the wheel fork is mounted for rotation via the mounting bore.

7. The cart according to claim 6 wherein each wheel fork pivot axle is mounted to the bottom side of the cargo platform via at least one securing element and threaded bolts extending through screw holes.

8. The cart according to claim 1 wherein all wheel forks have the same folding wheels, mounting hardware, and locking devices.

9. The cart according to claim 1 wherein the cargo platform includes oval through holes serving as handgrips close to the various side edges.

10. The cart according to claim 1 wherein the cargo platform exhibits side edges running diagonally towards each other towards the front.

11. The cart according to claim 10 wherein the forward foldable wheels in their outward folded fold position project beyond the diagonal side edges but not beyond the straight edges defining the largest breadth of the cargo platform.

12. The cart according to claim 1 wherein on the bottom side of the cargo platform at least one flat hollow box is secured, wherein the at least one box does not project further from the bottom side than the folded-in wheel forks.

13. A cart according to claim 1 wherein the cargo platform comprises holes adapted to secure goods being transported on the cargo platform.

14. The cart according to claim 1 further comprising anti-skid strips projecting slightly from the upper side of the cargo platform.

15. The cart according to claim 1 further comprising a spacer disk between the bottom side of the cargo platform and the securing element for the rear wheel fork rotation axle.

16. The cart according to claim 1 wherein a guide element is provided on the wheel fork pivot axle axially outside each wheel fork,
wherein the guide element includes at least one hollow cylindrical recess for the sliding reception of a securing bolt,
wherein a tip segment is introduced into the at least one hollow cylindrical recess of the respective wheel fork by sliding the securing bolt.

17. The cart according to claim 16 wherein the wheel fork is releasably securable in the operating position and at least one folded-in position.

18. The cart according to claim 16 wherein three hollow cylindrical recesses are provided in the wheel fork respectively set off by 90°.

19. The cart according to claim 18 wherein the three recesses correspond to two opposing folded positions and a there between lying operating position of the wheel fork.

20. The cart according to claim 16 wherein two or three hollow cylindrical recesses are provided in the guide element respectively set off by 90°, and that a recess is provided in the wheel fork for receiving the tip segment of the securing bolt.

21. The cart according to claim 16 wherein the securing bolt includes a thrust collar provided within the recess, which is biased in the direction of the tip segment of the securing bolt via a spring.

22. The cart according to claim 21 wherein the securing bolt includes a hand-grip part which widens outside the recess.

23. A cart comprising:
a horizontal cargo platform traveling on foldable wheels, each wheel mounted on a wheel fork, the cargo platform having a top side and a bottom side,
a vertically pivotable handle,
wherein each wheel fork is pivotally mounted on the cargo platform about an axis parallel to the cargo platform,
wherein each wheel is securable in an operating position projecting perpendicular from the bottom side of the cargo platform and in at least one folded position parallel to the cargo platform,
wherein the handle is connected to the bottom side of the cargo platform via a swivel mount,
wherein the handle is linked to the swivel mount in such a manner that it is foldable to a folded-in position parallel to the bottom side of the cargo platform,
wherein the handle is securable in the folded-in position,
wherein a wheel fork blocking element is secured to the wheel fork pivot axle;
wherein the wheel fork blocking element cooperates with a detent element fixed to the wheel fork to secure the wheel fork in the operating position or the folded-in position; and
wherein the swivel mount exhibits a U-shaped recess for receiving the wheel fork in a folded position.

24. A cart comprising:
a horizontal cargo platform traveling on foldable wheels, each wheel mounted on a wheel fork, the cargo platform having a top side and a bottom side,
a vertically pivotable handle,
wherein each wheel fork is pivotally mounted on the cargo platform about an axis parallel to the cargo platform,
wherein each wheel is securable in an operating position projecting perpendicular from the bottom side of the cargo platform and in at least one folded position parallel to the cargo platform,
wherein the handle is connected to the bottom side of the cargo platform via a swivel mount,
wherein the handle is linked to the swivel mount in such a manner that it is foldable to a folded-in position parallel to the bottom side of the cargo platform,
wherein the handle is securable in the folded-in position,
wherein a wheel fork blocking element is secured to the wheel fork pivot axle;
wherein the wheel fork blocking element cooperates with a detent element fixed to the wheel fork to secure the wheel fork in the operating position or the folded-in position; and
wherein the wheel fork securing element is disc-shaped and includes notches on its circumferential rim, between which curved segments extend, and in which a pre-tensioned spring-biased detent-element can engage during pivoting of the wheel fork, which can be manually lifted out of the respective notches and with repeated pivoting of the wheel fork can slide over the curved segments and engage in the next adjacent notches.

25. The cart according to claim 24 further comprising three indentations, set off respectively by 90° and two curve tracks lying between adjacent indentations.

26. The cart according to claim 25 wherein the pre-tensioned spring-biased detent-element engages one of the three indentations at a working position, wherein the pre-tensioned spring-biased detent-element engages another of the three indentations at a transportation position.

27. The cart according to claim 24 wherein the detent element is a leaf spring, of which one end is secured to the wheel fork and the other end carries a finger protection cap.

* * * * *